United States Patent [19]

Huneault

[11] Patent Number: 4,582,178
[45] Date of Patent: Apr. 15, 1986

[54] SEAT BRAKE SYSTEM

[76] Inventor: Gilles Huneault, 4578 Drolet Street, Montreal, Canada, H2T 2G4

[21] Appl. No.: 619,730

[22] Filed: Jun. 12, 1984

[51] Int. Cl.⁴ ............................ F16D 65/14; B62L 1/02
[52] U.S. Cl. .................................... 188/109; 188/24.12
[58] Field of Search ............ 183/24, 12, 24.13, 24.16, 183/24.14, 24.21, 24.22, 109, 27, 25, 20

[56] References Cited

U.S. PATENT DOCUMENTS

| | | | |
|---|---|---|---|
| 478,206 | 7/1892 | Owen | 188/24.16 |
| 605,735 | 6/1898 | Mayer | 188/109 |
| 633,266 | 9/1899 | Jamieson | 188/109 |
| 4,033,433 | 5/1977 | Kirk | 188/25 |
| 4,057,127 | 12/1977 | Woodring | 188/24.16 |

Primary Examiner—Duane A. Reger
Assistant Examiner—Alvin Oberley

[57] ABSTRACT

There are disclosed a brake system and a brake connection assembly for a bicycle that is actuated when the bicycle seat tilts in the fore-and-aft direction and that responds to the tilting by simultaneously and independently actuating a front wheel brake and a rear wheel brake. The brake assembly includes a connection body securely mountable on a post under the bicycle seat, a spindle connected to the seat frame to respond to tilting of the seat, and brake cable attachment members rotating with the spindle and, thus, operating a pair of brake cables operatively connected to the front and rear brakes, respectively.

6 Claims, 16 Drawing Figures

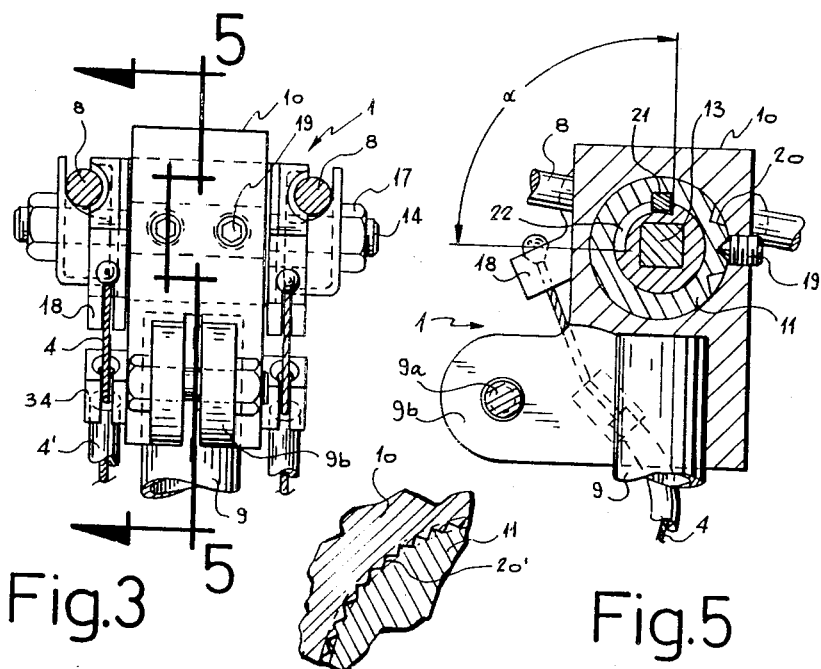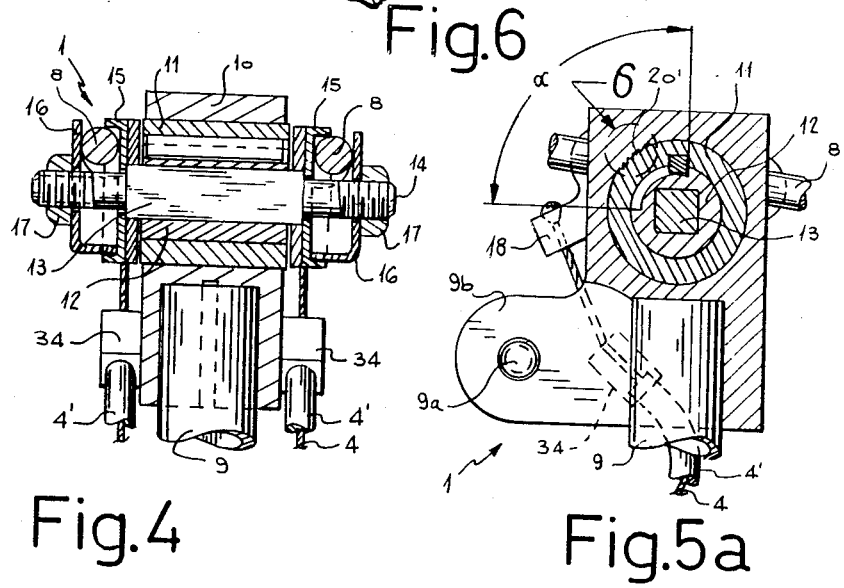

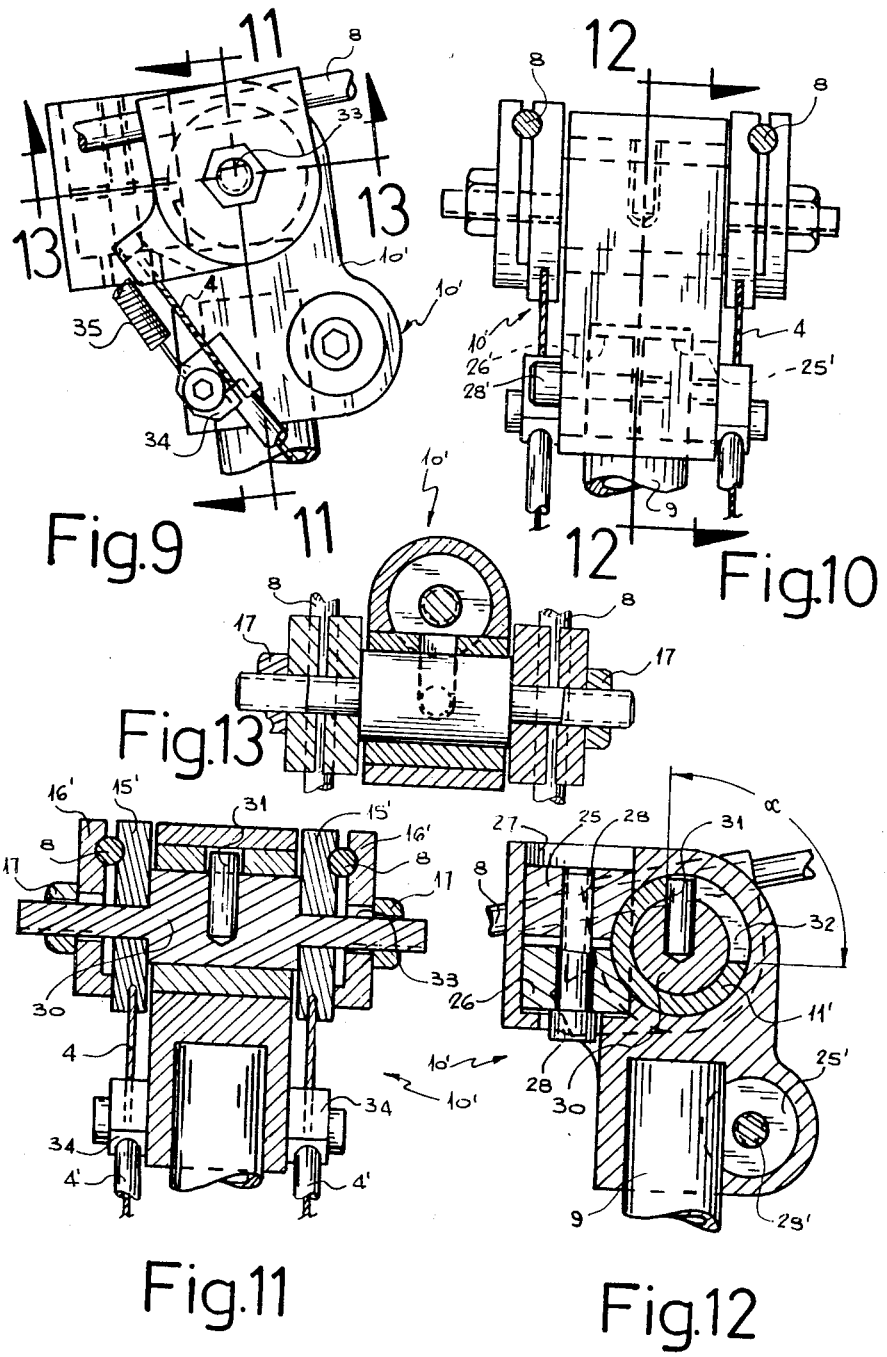

SEAT BRAKE SYSTEM

FIELD OF THE INVENTION

The device of the invention is designed to provide braking to a bicycle by the cyclist simply shifting his weight forwardly on the narrower front end portion of the seat. More specifically, the present system is associated to a bicycle seat that downwardly pivots at the front to actuate the brakes of both the front and rear wheels.

BACKGROUND OF THE INVENTION

In the prior art, there are disclosed brake devices for separately and independently actuating wheel brakes, but these devices are conventionally located on the handle-bar. This is not convenient, since control of the bicycle may require all the attention of the cyclist and not enough attention is left for braking. Therefore, there is a health hazard in combining braking and control of the bicycle at the same location as the handle-bar.

Another braking device includes a slidable member extending between the front portion of the bicycle seat and the tire of the rear wheel. That provides braking of only the rear wheel, not of the front wheel where it is most effective.

SUMMARY OF THE INVENTION

The general object of the invention is to provide a braking system which will actuate the brakes on both the front and the rear wheels of a bicycle, simultaneously but independently one relative to the other.

Another object of the invention is to provide a system with single actuation of two brake lines wherein malfunction or breakage of one brake line is not to affect the other brake line.

A further object of the present invention is to provide a braking system which is readily installed on a conventional bicycle with minimal modifications required.

Still another object of the present invention is to provide a safe and reliable braking system for braking both wheels of a bicycle without the use of the hands needed on the handle-bar.

The present invention defines a brake assembly for a bicycle having a front wheel brake, a rear wheel brake, a bicycle frame and a bicycle seat operatively tiltable in the fore-and-aft direction. This brake assembly comprises a connection body to be operatively mounted on a post under the seat, a movable member movably mounted on the connection body and operatively connecting to the seat and movable in response to its tilting; and a pair of brake attachment elements attached to the movable member movable with it, and constructed and arranged for attachment of brake cables to them and for simultaneous and independent actuation of the brake cables and of the front and rear brakes in response again to tilting of the bicycle seat. The movable member more specifically constitutes a spindle longitudinally extending transversely of the bicycle to readily convert the tilting of the seat into rotation in the fore-and-aft direction and, thus, produce leverage operatively pulling on the brake cables.

The brake assembly device preferably includes adjustment of the angular position of an outer bushing carrying the spindle to adust the resting angle of the seat for comfort of a cyclist.

BRIEF DESCRIPTION OF THE DRAWINGS

FIGS. 2 to 5a are views of a connection assembly forming part of the braking system of FIG. 1 and shown on an enlarged scale;

FIGS. 2 and 2a are side views in elevation of the connection assembly in position before and after pivoting of the bicycle seat;

FIG. 3 is a rear view in elevation of the connection assembly with seat frame rods shown in cross-section;

FIG. 4 is a sectional view on line 4—4 of FIG. 2;

FIG. 5 is a cross-sectional view, taken along line 5—5 of FIG. 3;

FIG. 5a is similar to FIG. 5 but shows a slightly different alternative construction;

FIG. 6 is a still enlarged fragmentary view of a portion of FIG. 5a taken within circle 6 in that FIG. 5a;

FIGS. 9 to 13 are views of another embodiment of a connection assembly;

FIG. 9 is a side view in elevation of the connection assembly according to another embodiment of the present invention, as compared to FIGS. 1 to 8 inclusive;

FIG. 10 is a front view in elevation of the connection assembly of FIG. 9, showing the seat frame rod in cross-section;

FIG. 11 is a sectional view taken along line 11—11 of FIG. 9;

FIG. 12 is a sectional view taken along line 12—12 of FIG. 10; and

FIG. 13 is a cross-sectional view taken along line 13—13 of FIG. 9.

DETAILED DESCRIPTION OF THE PREFERRED EMBODIMENTS OF THE INVENTION

Figure 1:
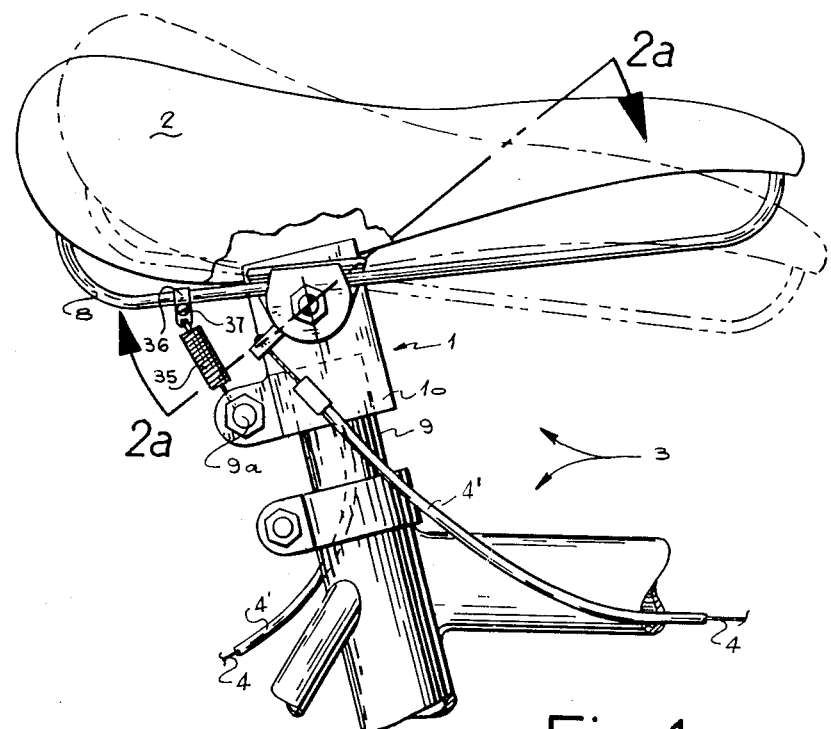
FIG. 1 is a side view in elevation of a bicycle seat operatively connected to a braking system according to one embodiment of the present invention.
Figure 7:
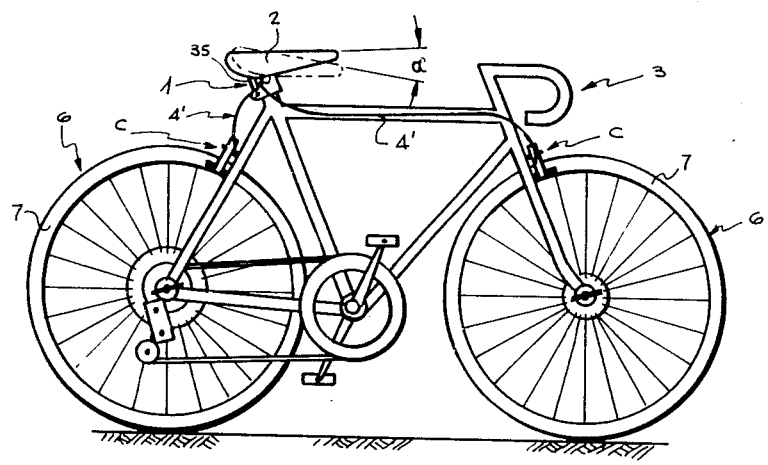
FIG. 7 is a side view in elevation of an upstanding bicycle embodying the seat brake system.

The illustrated seat brake system includes a connection assembly 1 designed to fit under the seat or saddle 2 of a bicycle 3, as shown in FIGS. 1 and 7. Saddle 2 has a conventional shape defining a wider rear end portion and a narrower front end portion when seen in top plan view. The seat brake system also includes brake cables, of conventional Bowden-Type construction, adapted to be operatively connected to conventional caliper brakes C. As shown in FIGS. 1, 7, 8, and 8a, those caliper brakes apply pressure against the opposite sides of the rim and, thus, produce braking of both the front and the rear wheels 6 having tires 7. Each brake cable includes a flexible wire core 4 slidable in a flexible sheath 4'. The illustrated bicycle seat 2 includes a frame having a pair of longitudinal rod sections 8. The connection assembly 1 is fixedly connected to the intermediate portion of the rod sections 8 and to the conventional seat mounting post 9 which is telescopically adjustably secured within the bicycle frame.

The brake connection assembly 1 comprises a body 10 securely connected to the post 9 by a transverse bolt 9a in a known manner through the laterally adjacent ears 9b, to adjustably and removably mount the body 10 and the seat 2 on the upper end of the post. The body 10 is formed with a cylindrical cavity into which is tightly engaged the upper end of the post 9. The body 10 is also formed with a transverse bore housing an outer bushing 11, an inner bushing 12, and the squared intermediate portion 13 of a spindle 14. The longitudinal rod sections 8 are secured to the spindle 14 on the laterally-opposite sides of the body 10 and at the opposite ends of the bushings 11 and 12 by clamping members 15 and 16 tightened against the ends of the squared intermediate portion 13 by nuts 17 engaged on the threaded ends of spindle 14. The front and rear brake cable wires 4 are each attached fastening means to the outer end of an extension arm 18 of the corresponding clamping member 15. The ends of the two cable sheaths 4' are fixed to anchoring blocks 34, which are secured to body 10 and are in respective register with the outer end of each arm 18.

Figure 2:
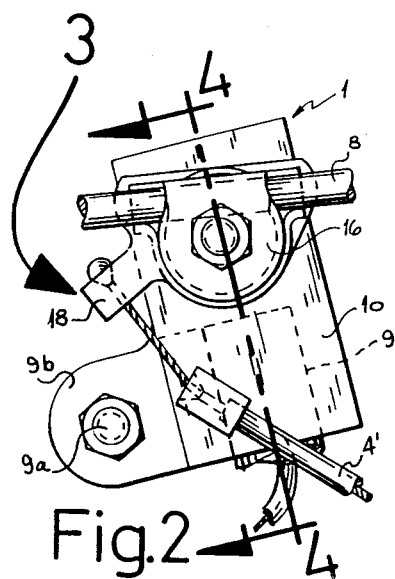
Figure 2A:
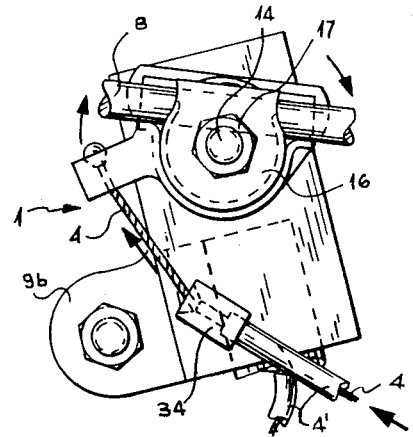

The angular position of outer bushing 11 in body 10 can be adjusted by a setscrew 19 (FIG. 5) engaging through that body casing 10 a selected one of notches 20 in bushing 11, or by the fluted arrangement 20' (FIGS. 5a and 6) made of serrated portions of the periphery of the outer bushing 11 and of the inside of the transverse bore in registry one with the other. Rotation of inner bushing 12 within outer bushing 11 is limited to about 90° by a key 21 engaging a 90° arcuate slot 22 of inner bushing 12, as indicated by the angle α in FIGS. 5 and 5a. As shown in FIGS. 2, 2a, downward pivoting of the front of seat 2 pulls cable wires 4, which causes wheel braking. Return movement of cable wires 4 is obtained by the conventional tension springs 23 of the caliper brakes C.

Figures 8, 8A:
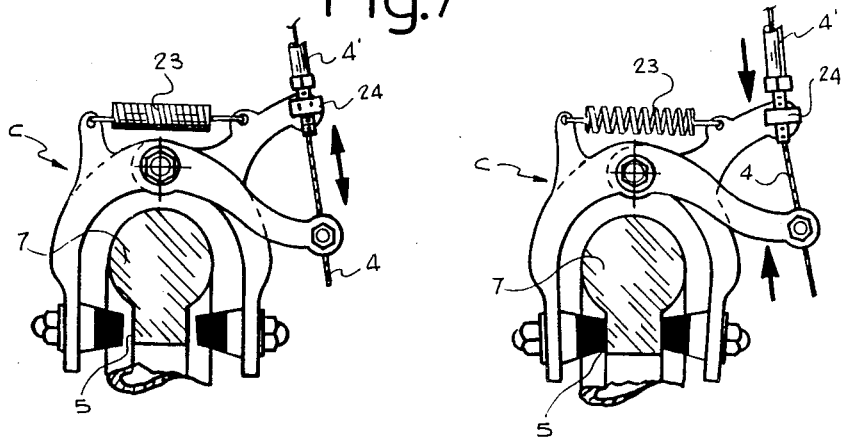
FIGS. 8 and 8a are front views on an enlarged scale of the caliper brakes of FIG. 7 in two positions respectively illustrating before and after actuation of the braking system.

Both cable wires 4 will be subjected to an identical pull by the pivoting of arms 18, but the adjustment of the optimum differential braking pressure applied on the front (60%) wheel and the rear (40%) wheel rims 5 may be made at the level of the caliper brakes C, themselves by adjusting the threaded outer end of cable sheath 4' in nut 24 carried by one arm of the caliper brake and/or by adjusting the connection of wire 4 to the other arm of the caliper brake. (FIG. 8).

The resting angle of the seat 2 may be adjusted for comfort of the cyclist by the setscrew 19 or by the fluted arrangement 20', as previously described. In the latter case, one has to remove outer bushing 11 from casing 10 and to reposition it after rotation thereof to change the relative orientation of seat 2.

In the embodiment of FIGS. 9 to 13, outer bushing 11' is clamped in ay rotated position within the transverse bore of body 10' by two block members 25, 26 combined in bore 27 of casing 10' and brought together by screwing bolt 28 in block 25. A similar arrangement of block members 25', 26' and bolt 28' serves to clamp the body 10' on the bicycle post 9. Inner bushing 12 and spindle 14 are replaced by a single spindle 30, the central enlarged cylindrical portion of which is rotatable within outer bushing 11' through a 90° arc limited by a pin 31 carried by the spindle 30 and displaceable within a 90° slot 32 made in outer bushing 11'. The ends of the spindle 30 are threaded but have a flat 33 (FIG. 9) to prevent relative rotation of clamping member 15'. The ends of the two cable sheaths 4' are fixed to body 10' by anchoring blocks 34 as in the first embodiment.

What I claim is:

1. For a vehicle having a front wheel brake, a rear wheel brake, a vehicle frame including a post, and a driver seat operatively tiltable in the fore-and-aft direction, a brake assembly comprising a connection body operatively mountable on the upper end of said post and including an outer bushing housed in and secured to the connection body and axially extending transversely thereof, an inner member rotatably mounted in said outer bushing and operatively connected to the driver seat and rotatable in response to tilting of said seat, a pair of brake cable core wire attachment means attached to the inner member, rotatable therewith and constructed and arranged for attachment of brake cable core wires thereto for simultaneous and independent actuation of the brake cable core wires in response to tilting of the driver seat, the inner member comprising an inner bushing and the squared portion of a transversely-extending spindle with said inner bushing being rotatable within said outer bushing, said inner bushing including a cylindrically-extending arcuate slot and a key carried by said outer bushing and engaging and displaceable along said arcuate slot for limited rotation of said inner bushing relative to the connection body.

2. For a vehicle having a front wheel brake, a rear wheel brake, a vehicle frame including a post, and a driver seat operatively tiltable in the fore-and-aft direction, a brake assembly comprising a connection body operatively mountable on the upper end of said post and including an outer bushing housed in and secured to the connection body and axially extending transversely thereof, an inner member rotatably mounted in said outer bushing and operatively connected to the driver seat and rotatable in response to tilting of said seat, a pair of brake cable core wire attachment means attached to the inner member, rotatable therewith and constructed and arranged for attachment of brake cable core wires thereto, for simultaneous and independent actuation of the brake cable core wires in response to tilting of the driver seat, the inner member forming a spindle having a transversely intermediate enlarged cylindrical portion rotatable within said outer bushing, said outer bushing including a cylindrically-extending arcuate slot, and said spindle carrying a pin operatively engaging within said slot for limited rotation of said spindle relative to the connection body.

3. For a vehicle having a front wheel brake, a rear wheel brake, a vehicle frame including a post, and a a driver seat operatively tilting in the fore-and-aft direction, a brake assembly comprising a connection body operatively mountable on the upper end of said post and including an outer bushing housed in and secured to the connection body and axially extending transversely thereof, an inner member rotatably mounted in said outer bushing and operatively connected to the driver seat and rotatable in response to tilting of said seat, rotation limiting means for limiting rotation of said inner inner member relative to said outer bushing, a pair of brake cable core wire attachment means attached to the inner member, rotatable therewith and constructed and arranged for attachment of brake cable core wires thereto for simultaneous and independent actuation of the brake cable core wires in response to tilting of the driver seat, and a series of notches formed in said outer bushing, serially along the periphery thereof, and an angular position adjusting set-screw screwed through said connection body and operatively engaging in one of said notches.

4. For a vehicle having a front wheel brake, a rear wheel brake, a vehicle frame including a post, and a driver seat operatively tilting in the fore-and-aft direction, a brake assembly comprising a connection body operatively mountable on the upper end of said post and including an outer bushing housed in and secured to the connection body and axially extending transversely thereof, an inner member rotatably mounted in the said outer bushing and operatively connected to the driver seat and rotatable in response to tilting of said seat, rotation limiting means for limiting rotation of said inner member relative to said outer bushing, a pair brake cable core wire attachment means attached to the inner member, rotatable therewith and constructed and arranged for attachment of brake cable core wires thereto for simultaneous and independent actuation of the brake cable core wires in response to tilting of the driver seat, and an angular positionadjusting fluted arrangement consisting of serrated portions formed at the periphery of said outer bushing and inside said connection body and constructed and arranged for registry of said serrated portions in selected angular relationship one relative to the other circumferentially relative to the outer bushing.

5. For a vehicle having a front wheel brake, a rear wheel brake, a vehicle frame including a post and a driver seat operatively tiltable in the fore-and-aft direction, a brake assembly comprising a connection body operatively mountable on the upper end of said post and including an outer bushing housed and secured to the connection body and axially extending transversely thereof, an inner member rotatably mounted in said outer bushing and operatively connected to the driver seat and rotatable in response to tilting of said seat, rotating limiting means for limiting rotation of said inner member relative to said outer bushing, a pair of brake cable core wire attachment means attached to the inner member, rotatable therewith and constructed and arranged for attachment of brake cable core wires thereto for simultaneous and independent actuation of the cable core wires in response to tilting of the driver seat, and further including two block members housed within said connection body and mating with said outer bushing, and tightening means for bringing said two block members together for clamping into any rotated position, said outer bushing in said connection body.

6. For a vehicle having a vehicle frame, a front and a rear wheel carried by said frame, a seat mounting post secured to said frame, a driver seat carried by the upper end of said post and having a wider rear end portion and a narrower front end portion, said seat tiltable in the foreand-aft direction, a front wheel caliper brake and a rear wheel caliper brake carried by said frame, front and rear brake cables connected to said front and rear brakes, respectively each brake cable including a flexible wire core and a flexible sheath for said wire core, a brake-actuating assembly comprising a connection body secured to the top end of said post and having a bore transverse to said post, a rotatable member rotatably mounted within said bore, fastening means fastening said seat to said rotatable member with the intermediate portion of said seat vertically overlying said connection body, rotation-limiting means carried by said body and limiting rotation of said rotatable member in said body, a pair of sheath attachment means carried by said body for attaching each sheath to said body, a pair of arms fixed to said rotatable member in respective register with said sheath attachment means and extending rearwardly from said rotatable member, and a wire core fastening means carried by the outer end of each of said arms, whereby downward tilting of the front portion of said seat will cause said arms to pull both said wire cores to actuate said front and rear wheel caliper brakes.

* * * * *